United States Patent [19]
Wooters

[11] 3,845,252
[45] Oct. 29, 1974

[54] WALL TELEPHONE FRAME AND HOLDER

[75] Inventor: Dwight N. Wooters, Wooster, Ohio

[73] Assignee: Rubbermaid Incorporated, Wooster, Ohio

[22] Filed: Apr. 26, 1973

[21] Appl. No.: 354,675

[52] U.S. Cl. .......... 179/146 R
[51] Int. Cl. .......... H04m 1/04
[58] Field of Search .......... 179/146 R, 118; 312/233, 312/245; 281/45; D6/136; D26/14 A

[56] References Cited

UNITED STATES PATENTS

| | | | |
|---|---|---|---|
| D148,464 | 1/1948 | Goldman | D26/14 A |
| D206,233 | 11/1966 | Hoth | D6/136 |

OTHER PUBLICATIONS

Better Homes and Gardens, Feb., 1971 page 129.
House & Garden, Sept. 1959, page 74.

*Primary Examiner*—William C. Cooper
*Attorney, Agent, or Firm*—Hamilton, Renner & Kenner

[57] ABSTRACT

A reversible frame for surrounding a wall telephone having an integral pad holder frame at one side for cradling a telephone receiver or handset when off the hook, and detachably mounting a writing pad holder.

6 Claims, 8 Drawing Figures

WALL TELEPHONE FRAME AND HOLDER

BACKGROUND OF THE INVENTION

Conventional wall telephones are often not provided with any means to cradle or hold the telephone handset when it is off the hook, and when calling an additional party to the phone the handset is often left dangling on the cord in an unsightly and inconvenient position. Moreover, the conventional wall telephone provides no means for holding a memorandum pad on which to write notes or messages relating to the telephone calls, so that the user resorts to any nearby shelf or table not associated with the telephone, with the result that the note or message often becomes misplaced or unnoticed.

SUMMARY OF THE INVENTION

It is an object of the present invention to provide a novel and attractive frame for a wall telephone which mounts Another object is to provide a novel writing pad holder which is detachably mounted in two selective positions in one side of the frame.

A further object is to provide upper and lower telephone receiver cradles selectively covered by the writing pad holder to permit reversing the position of the frame relative to the telephone and still providing a phone receiver cradle below the pad holder.

A still further object is to provide a lightweight and inexpensive frame for a wall telephone having a receiver cradle and writing pad holder on one side, said frame being selectively reversible to position the holder on the opposite side.

These and other objects are accomplished by the improved construction and arrangement comprising the present invention, a preferred embodiment of which is shown by way of example in the accompanying drawings, and described in detail herein. Various modifications and changes in details of construction are comprehended within the scope of the appended claims.

DESCRIPTION OF A PREFERRED EMBODIMENT

Figure 1:
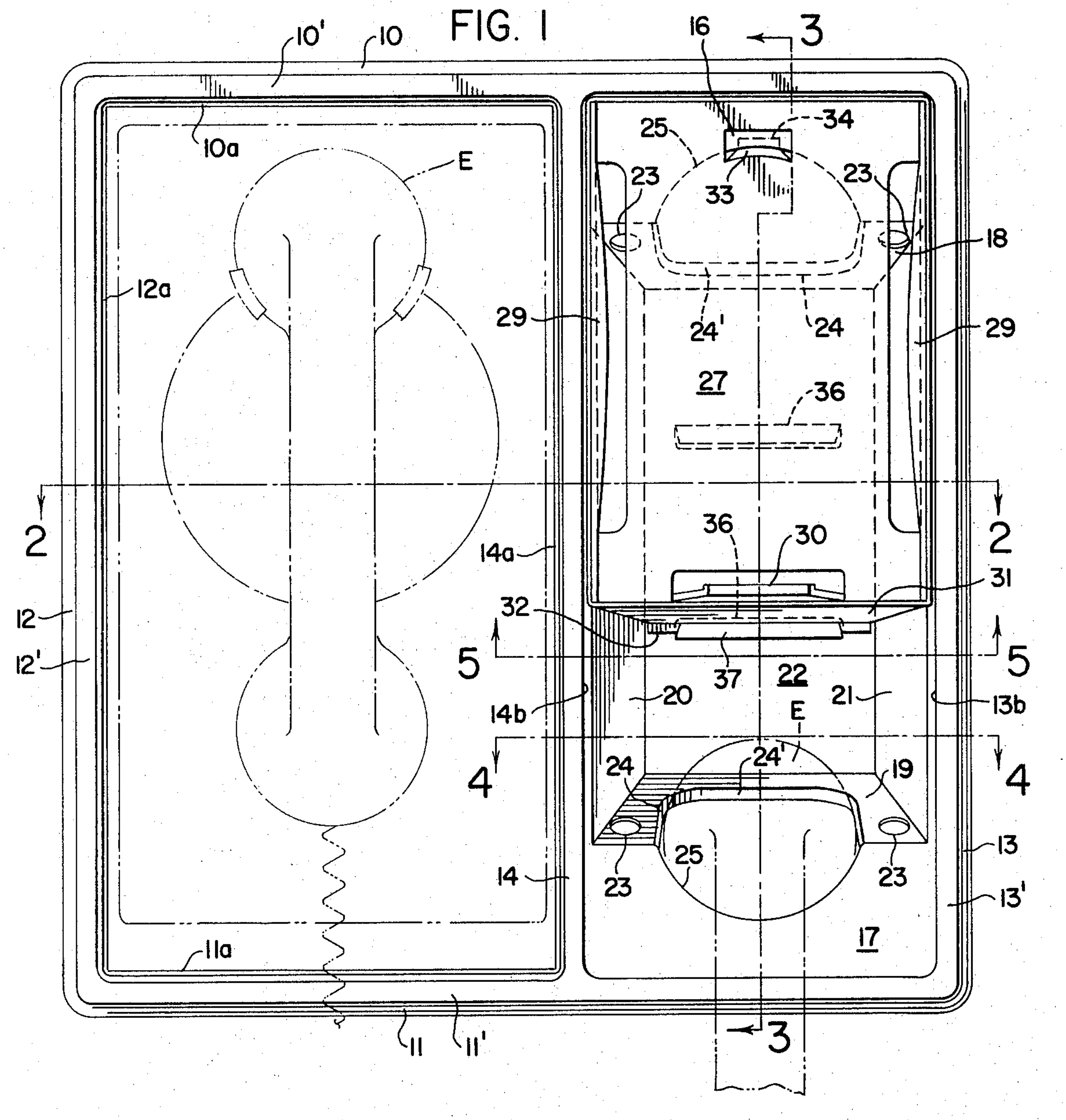
FIG. 1 is a plan view of a preferred embodiment of the novel wall telephone frame and holder in position surrounding a wall telephone shown in phantom lines, with the detachable pad holder mounted therein, and the receiver held in off-the-hook position also shown in phantom lines.

The novel wall telephone frame and holder is preferably molded of suitable plastic material such as polystyrene, and comprises rectangularly arranged upper and lower walls 10 and 11 and side walls 12 and 13. The walls 10, 11, 12 and 13 preferably taper inwardly slightly from their rear to front edges, and the front edges connect with a front marginal rectangular strip portion extending in a vertical plane continuously around the four walls of the frame, indicated at 10′, 11′, 12′ and 13′, respectively.

A vertical dividing strip 14 connects upper and lower marginal strips 10′ and 11′ in the same vertical plane, and the strips 10′, 11′, 12′ and 14 form a rectangular frame for surrounding a telephone, while the strips 10′, 11′, 13′ and 14 form a pad holder frame.

At the inner edges of the strips 10′, 11′, 12′ and the adjacent side edge of strip 14 are inturned offset flanges **10*a*, 11*a*, 12*a* and 14*a*, respectively, and these flanges form the rectangular frame opening for surrounding a telephone. The pad holder frame preferably is somewhat narrower and comprises slightly recessed upper and lower vertical front panel walls 16 and 17. Between the panel walls 16 and 17 the inner edges of strips 13′ and 14 have inturned offset flanges 13*b* and 14*b*. From the flanges 13*b* and 14*b* and the adjoining edges of panel walls 16 and 17, inwardly sloping top, bottom and side walls 18, 19, 20 and 21 extend rearwardly and join a rear vertical wall 22 in the plane of the rear edges of the frame walls 10, 11, 12 and 13. The walls 18, 19, 20, 21 and 22 form a well or recess in which the pad holder is detachably mounted. Apertures 23 are preferably provided in top and bottom walls 18 and 19** for holding pencils and the like.

The top and bottom sloping walls 18 and 19 have central U-shaped cutouts 24 adapted to fit around the upper end or ear piece E of a telephone receiver or handset, as indicated in FIG. 1, and these cutouts merge with arcuate cutouts 25 in the upper and lower panel walls which are adapted to engage under and support the ear piece. As shown in FIG. 1, the cutouts 24 and 25 in the lower walls 19 and 17 are adapted to support the ear piece, but when the frame is reversed by rotating at 180° to position the pad holder frame on the opposite side in the position of FIG. 8, the cutouts in the walls 16 and 18 are in the bottom position for supporting the receiver. Preferably, inturned flanges 24′ and 25′ are provided around the edges of the cutouts 24 and 25. Reinforcing or stiffening ribs 26 extend from front to rear in the upper and lower frame walls 10 and 11 adjacent to the panel walls 16 and 17.

Figure 6:
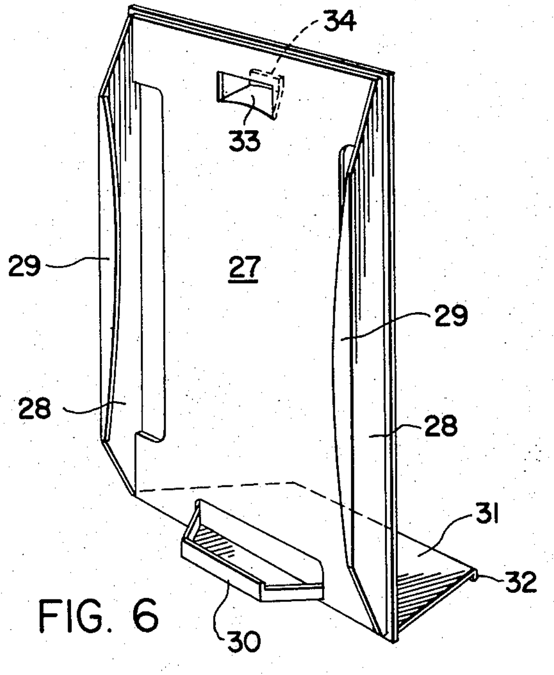
FIG. 6 is a perspective view of the pad holder detached.

The pad holder shown detached in FIG. 6 has a flat base wall 27 with forwardly extending flanges 28 at its side edges. Preferably the flanges 28 have beveled top and bottom edges and at the front edges are arcuate flanges 29 extending laterally inward toward each other for overlying opposite edges of a rectangular writing pad (not shown) abutting the rear wall 27. A flanged ledge 30 projects forwardly from the bottom of the wall 27 for supporting a writing pad abutting the rear wall. A bottom mounting flange 31 extends rearwardly from the bottom edge of wall 27 and terminates in a downturned angular lip flange 32. Medially of the upper portion of base wall 27 is a punched out rearwardly extending flange 33 terminating in an upturned angular lip flange 34.

Figure 3:
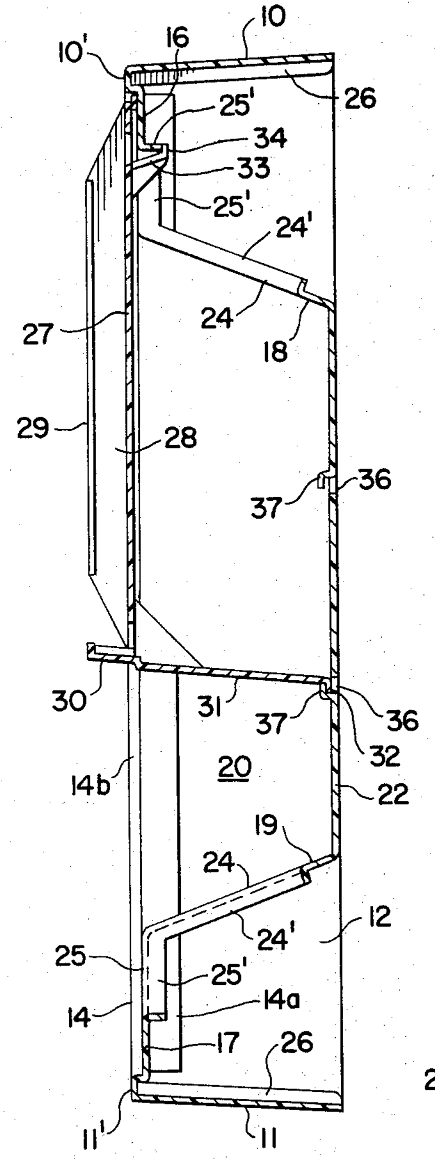
FIG. 3 is a vertical sectional view on line 3—3 of FIG. 1.
Figure 4:
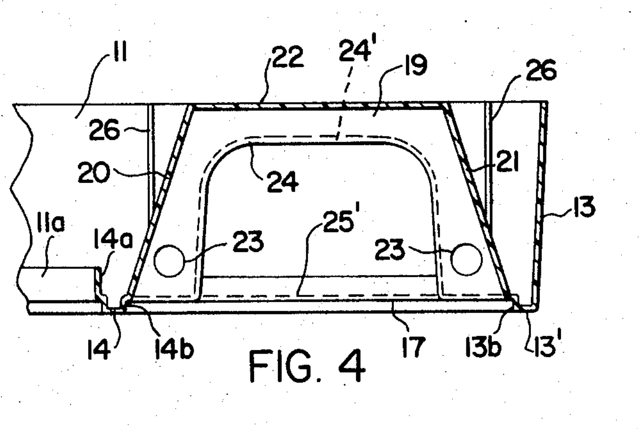
FIG. 4 is a partial sectional view on line 4—4 of FIG. 1.
Figure 5:
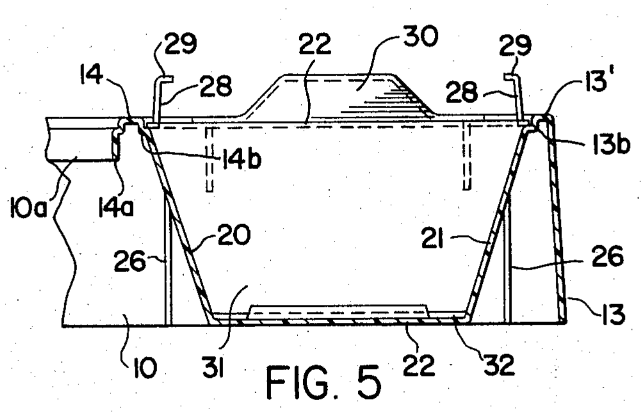
FIG. 5 is a partial sectional view on line 5—5 of FIG. 1.

The pad holder is designed to be detachably mounted in the upper part of the pad holder frame by snapping the upturned lip flange 34 behind the edge of upper cutout flange 25', and the downturned lip flange 32 into the lower of two slots 36 in the wall 22, each of said slots preferably having angular flanges 37 projecting forwardly therefrom, behind which the lip flange 32 of the pad holder is adapted selectively to engage. As seen in FIG. 3, the lip flange 32 is engaged behind the flange 37 of the lower slot, and when the frame is reversed to the position of FIG. 8 the flange 32 would be similarly engaged in the other slot 36.

Figure 7:
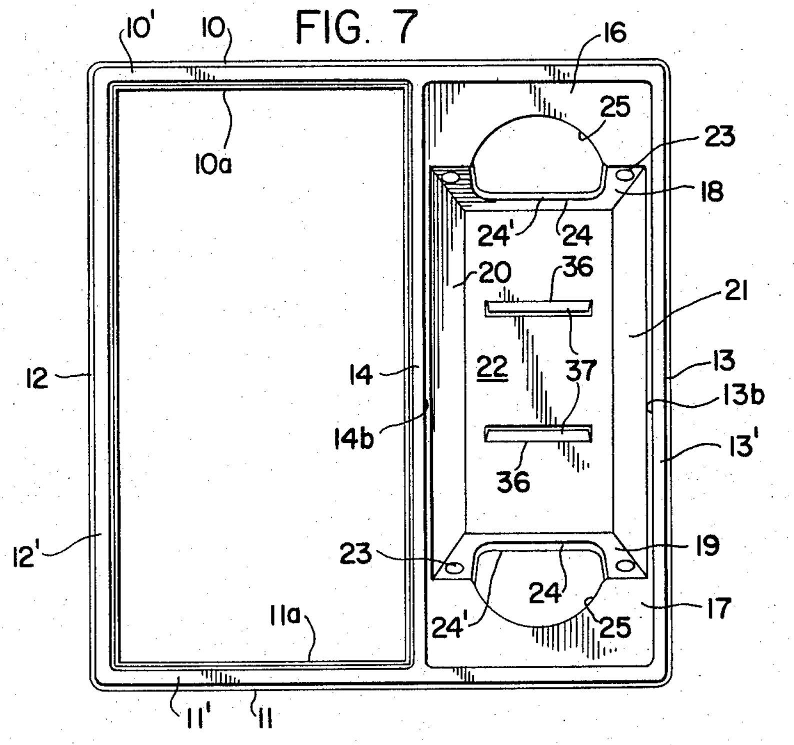
FIG. 7 is a plan elevational view of the improved frame with the pad holder frame detached therefrom.

In use, the improved frame and holder is positioned with its frame opening surrounding a wall telephone having its base mounted on the wall. The frame opening is made large enough to fit around the largest conventional wall telephone base. The frame is preferably provided with adhesive strips on the rear surface of wall 22 for mounting the frame on the wall, and depending upon the telephone location and accessibility, the frame may be mounted in the position of FIGS. 1 and 7 or in the reversed position of FIG. 8.

Figure 2:
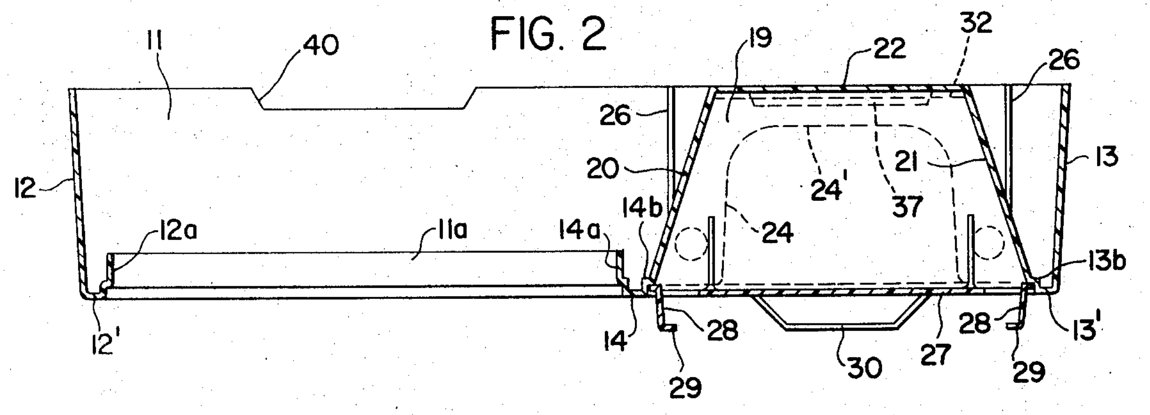
FIG. 2 is a horizontal sectional view on line 2—2 of FIG. 1.
Figure 8:
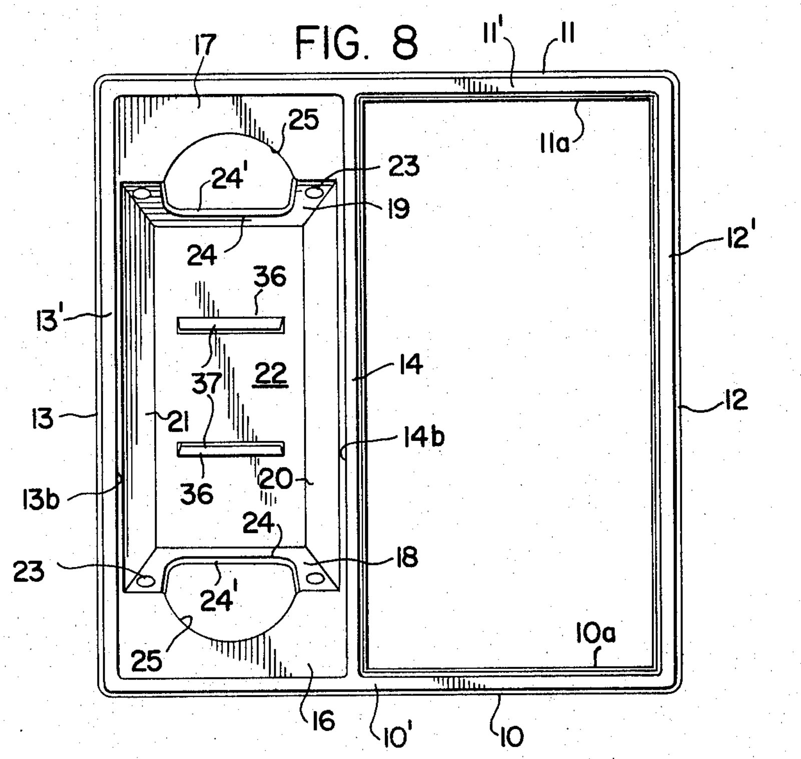
FIG. 8 is a similar view of the frame in reversed position.

The pad holder with a writing pad therein is then snapped in position covering the upper panel wall 16 and upper slot 36 as shown in FIG. 1, or covering the panel wall 17 and other slot 36 if in the reversed position of FIG. 8. The upper and lower frame walls 10 and 11 are provided with cutout openings 40 vertically aligned with the telephone base, as indicated in FIG. 2, through which the telephone power supply cord may pass in either the FIG. 7 or FIG. 8 position.

Accordingly, an attractive and compact reversible frame is provided for a wall telephone having a conveniently adjacent memorandum pad, pencil holders, and a cradle for holding the receiver in off-the-hook position when desired.

I claim:

1. A frame for a wall telephone having rectangularly arranged walls defining an opening for surrounding the telephone and forming a holder frame at one side of said opening, a writing pad holder detachably mounted in said holder frame, and a cradle within said holder frame adjacent said writing pad holder and adapted to hold the telephone handset when detached from the telephone.

2. A frame for a wall telephone as described in claim 1, in which the frame is reversible to position the holder frame at the opposite side of the opening.

3. A frame for a wall telephone as described in claim 2, in which the holder frame has upper and lower cradles, the upper cradle being located behind said writing pad holder.

4. A frame for a wall telephone as described in claim 3, in which the writing pad holder is adapted to be detachably mounted selectively over the upper and lower cradles, thereby permitting reversing the frame to position the holder frame on the opposite side of said frame opening.

5. A frame for a wall telephone as described in claim 4, in which the upper end of the writing pad holder is adapted to selectively resiliently engage the upper and lower cradles for mounting the pad holder in the holder frame.

6. A frame for a wall telephone as described in claim 5, in which the holder frame has a rear wall provided with two slots for selectively engaging the lower end of the pad holder to mount it in the holder frame.

* * * * *